United States Patent

Geulen

Patent Number: 6,038,609
Date of Patent: Mar. 14, 2000

[54] METHOD, COMMUNICATION NETWORK AND SERVICE ACCESS INTERFACE FOR COMMUNICATIONS IN AN OPEN SYSTEM INTERCONNECTION ENVIRONMENT

[75] Inventor: Eckhardt Geulen, Kerkrade, Netherlands

[73] Assignee: Telefonaktiebolaget LM Ericsson, Stockholm, Sweden

[21] Appl. No.: 09/053,662

[22] Filed: Apr. 2, 1998

[30] Foreign Application Priority Data

Apr. 4, 1997 [DE] Germany .................. 197 13 956

[51] Int. Cl.[7] .............. H04J 3/00; G06F 13/00; H04B 7/00
[52] U.S. Cl. ............ 709/250; 709/203; 709/218; 709/249; 370/401; 370/469
[58] Field of Search ................. 709/203, 218, 709/250, 249; 370/401, 469

[56] References Cited

U.S. PATENT DOCUMENTS

| | | | |
|---|---|---|---|
| 5,245,608 | 9/1993 | Deaton, Jr. et al. | 370/469 |
| 5,280,481 | 1/1994 | Chang et al. | 370/401 |
| 5,282,204 | 1/1994 | Shpancer et al. | 455/518 |
| 5,307,347 | 4/1994 | Duault et al. | 370/469 |
| 5,457,680 | 10/1995 | Kamm et al. | 370/332 |
| 5,570,355 | 10/1996 | Dail et al. | 370/352 |
| 5,570,359 | 10/1996 | Nguyen | 370/60 |
| 5,734,865 | 3/1998 | Yu | 709/250 |
| 5,771,459 | 6/1998 | Demery et al. | 370/401 |
| 5,825,759 | 10/1998 | Liu | 370/331 |
| 5,881,230 | 3/1999 | Christensen et al. | 709/203 |
| 5,894,478 | 4/1999 | Barzegar et al. | 370/401 |
| 5,912,885 | 6/1999 | Mitts et al. | 370/331 |

FOREIGN PATENT DOCUMENTS 0 432 924  6/1991  European Pat. Off. .

OTHER PUBLICATIONS

ITU–T X.200 (Jul. 1994): Information Technology—Open System Interconnection—Basic Reference Model: The Base Model.
ITU–T X.207 (Nov. 1993): Information Technology—Open System Interconnection—Application Layer Structure.
A. Tannenbaum, "XP002079086", Computer Networks, 1996, pp. 17–23.

Primary Examiner—Ahmad F. Matar
Assistant Examiner—William D. Thomson
Attorney, Agent, or Firm—Burns, Doane, Swecker & Mathis, L.L.P.

[57] ABSTRACT

The invention relates to a method, a communication network and a service access interface for performing communications between cooperating open systems in an open system interconnection environment. The upward service access point (USAP) is adapted to transfer layer-specific parameters, e.g. quality of service parameters to a layer of higher order. Thus, the running application can adaptively change its own performance to transmission characteristics in any one lower layer.

13 Claims, 5 Drawing Sheets

Prior Art

Prior Art

METHOD, COMMUNICATION NETWORK AND SERVICE ACCESS INTERFACE FOR COMMUNICATIONS IN AN OPEN SYSTEM INTERCONNECTION ENVIRONMENT

This application claims priority under 35 U.S.C. §§119 and/or 365 to DE 197 13 956.6, filed in Germany on Apr. 4, 1997; the entire content of which is hereby incorporated by reference.

FIELD OF THE INVENTION

The invention relates to a method, a communication network and a service access interface for performing communications between cooperating open systems in an open-system interconnection environment, where a communication between at least two open systems is performed by use of at least two layered layer communication means, which are interconnected through the service access interface. Each layer communication means comprises a number of layer-specific services and uses a number of layer-specific parameters for a communication between said services in the respective layer communication means.

BACKGROUND OF THE INVENTION

Figure 4:
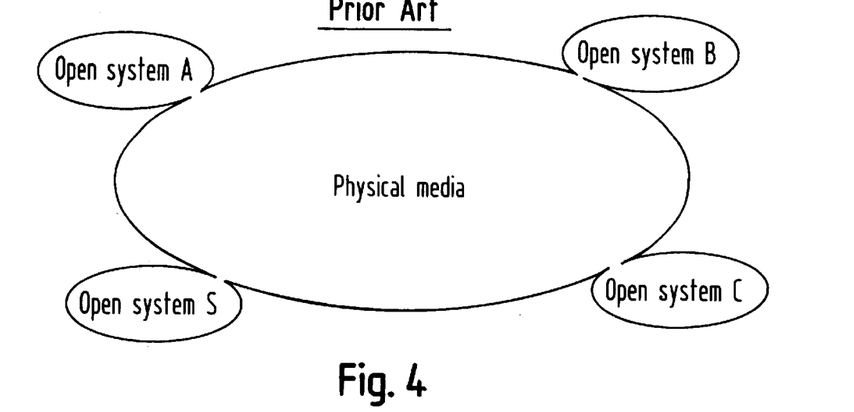
FIG. 4 shows an overview of an open system interconnection environment.

Broadly speaking, the invention relates to open-system interconnection environments as is shown in the attached FIG. 4. The term "open-system interconnection (OSI)t" qualifies standards for the exchange of information among systems, that are "open" to one another for this purpose by virtue of their mutual use of the applicable standards. Thus, the open-system interconnection environment is an abstract representation of the set of concepts, elements, functions, services, protocols etc. and is defined by a OSI-reference model and the derived specific standards, which, when applied to the configuration in FIG. 4, enable communications among the open systems A, B, C, S.

In the concept of OSI, a real system is a set of one or more computers, associated software, peripherals, terminals, human operators, physical processes, information transfer means etc. that forms an autonomous unit capable of performing information processing and/or information transfer. The "application process" is an element within a real open system, which performs the information processing for a particular application and some examples of application processes which are applicable to the open system definition are a FORTRAN program executing in a computer center and accessing a remote database or a process control program executing in a dedicated computer attached to some industrial equipment. Furthermore, as is shown in FIG. 4, the physical media for open systems interconnection provides the means for the transfer of information between the open systems.

To allow an interconnection of the real open systems, use is made of abstract models, which, however, find their equivalent in hardware or software realizations. A widespread standard is the OSI RM-international standards—organization open systems interconnection reference model—, which uses a layered architecture for interconnection as is shown in FIG. 5.

Figure 5:
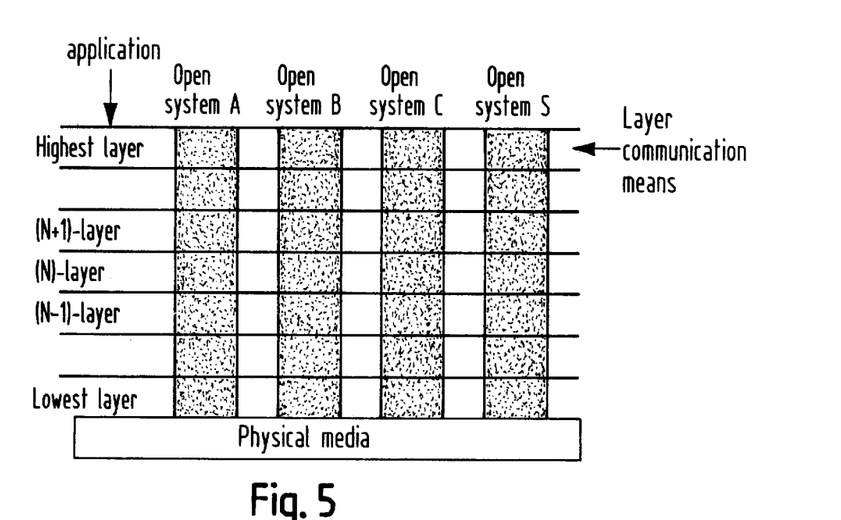
FIG. 5 shows a model of the concept of using a layered architecture.
Figure 6:
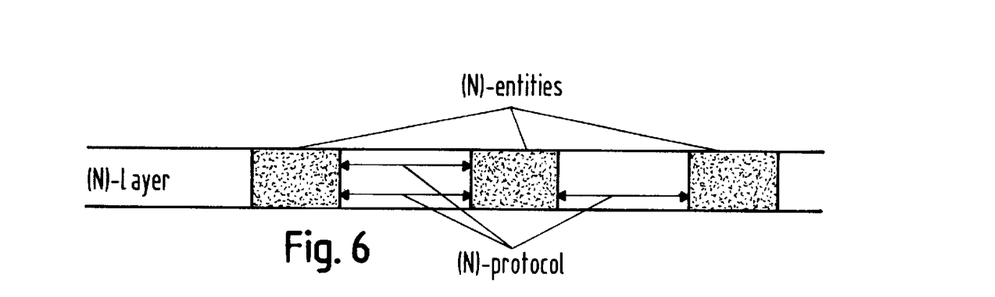
FIG. 6 shows how the individual entities in each layer (layer communication means) exchange information via the use of protocols.

As is seen in FIG. 5, the concept of layering in cooperating open systems is based on the idea of introducing several communication layers from the physical media, wherein the highest layer is provided for interconnecting to a running application. Thus, each layer, which interconnects specific entities (services) of the respective open systems may be regarded as a "layer communication means". As is seen in FIG. 6, the individual entities within one layer communicate via the use of the (N)-protocol.

Thus, in such conventional data-communication systems, the communication requirements from the application into data streams in the lower layers is translated. In this translation process, each layer inserts a specific portion of intelligence which is specific to this layer's functionality.

Since data communication in advanced environments does include transfer over wireless systems and furthermore, system integration efforts lead to a decoupling of actual bearer capabilities and higher abstract (data) communication services, it will soon be common to use various networks for various data transmission services of one application simultaneously. It is obvious that the layered architecture described above is particularly advantageous, since the focus is on seamless roaming without the need to give the end-user any feedback about the actual used transmission media.

Figure 7:
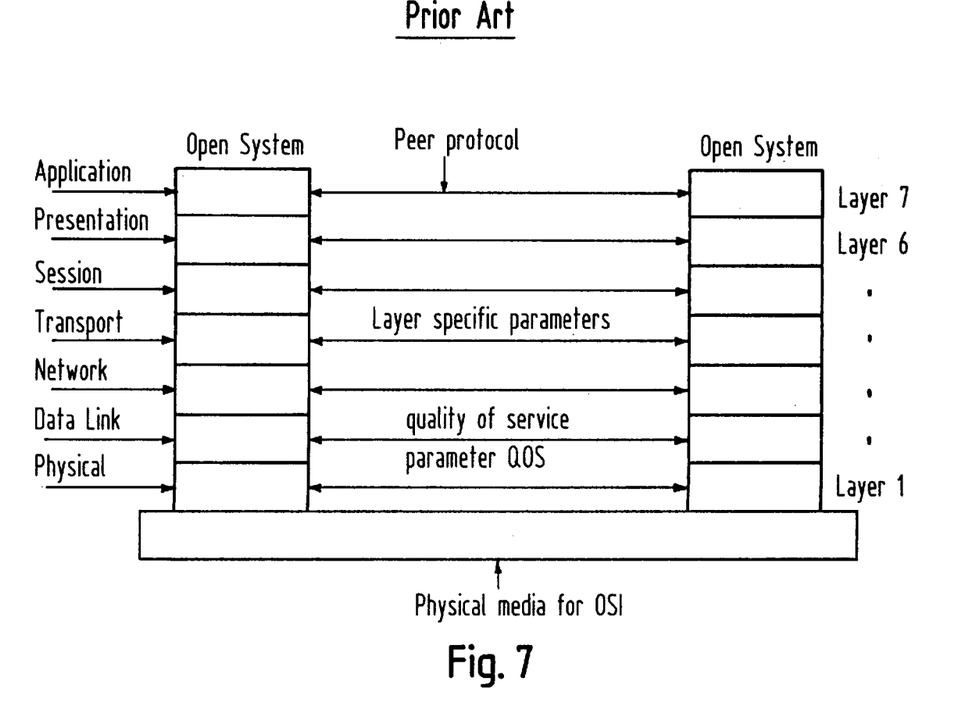
FIG. 7 shows a conventional standard reference model with seven layers.

FIG. 7 shows an architecture with seven layers on top of the physical media. As aforesaid, within each layer, the "layer communication means" uses layer-specific parameters for the exchange of information to its peer-layer. Such layer-specific parameters are e.g. single transmission related parameters, such as the expected transmission delay, probability of corruption, probability of loss or duplication, probability of wrong delivery, cost, protection from unauthorized access and priority, multiple transmission related parameters like the expected throughput and the probability of out-of-sequence delivery or connection-mode parameters such as connection establishment delay, connection establishment failure probability, connection release delay, connection release failure probability and connection resilients. Such layer-specific parameters may be summarized as "quality of service (QOS) parameters".

Figure 8:
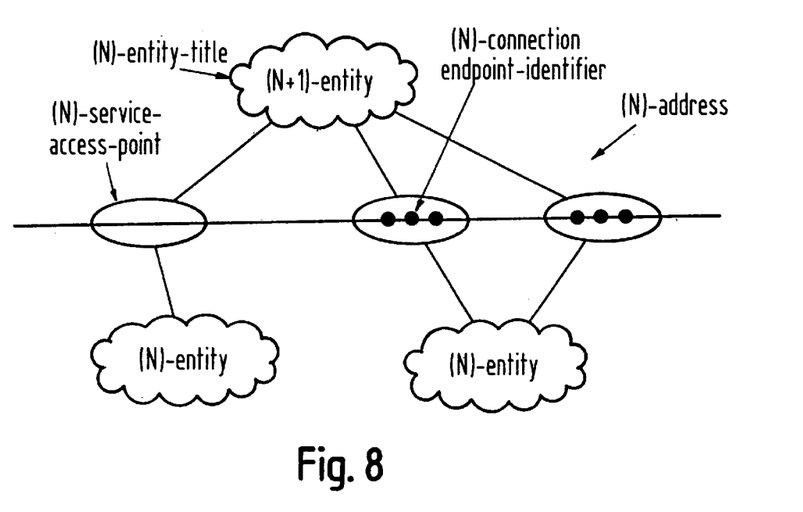
FIG. 8 shows how the individual entities in two adjacent layers cooperate through the use of service access points (interfaces)
Figure 9:
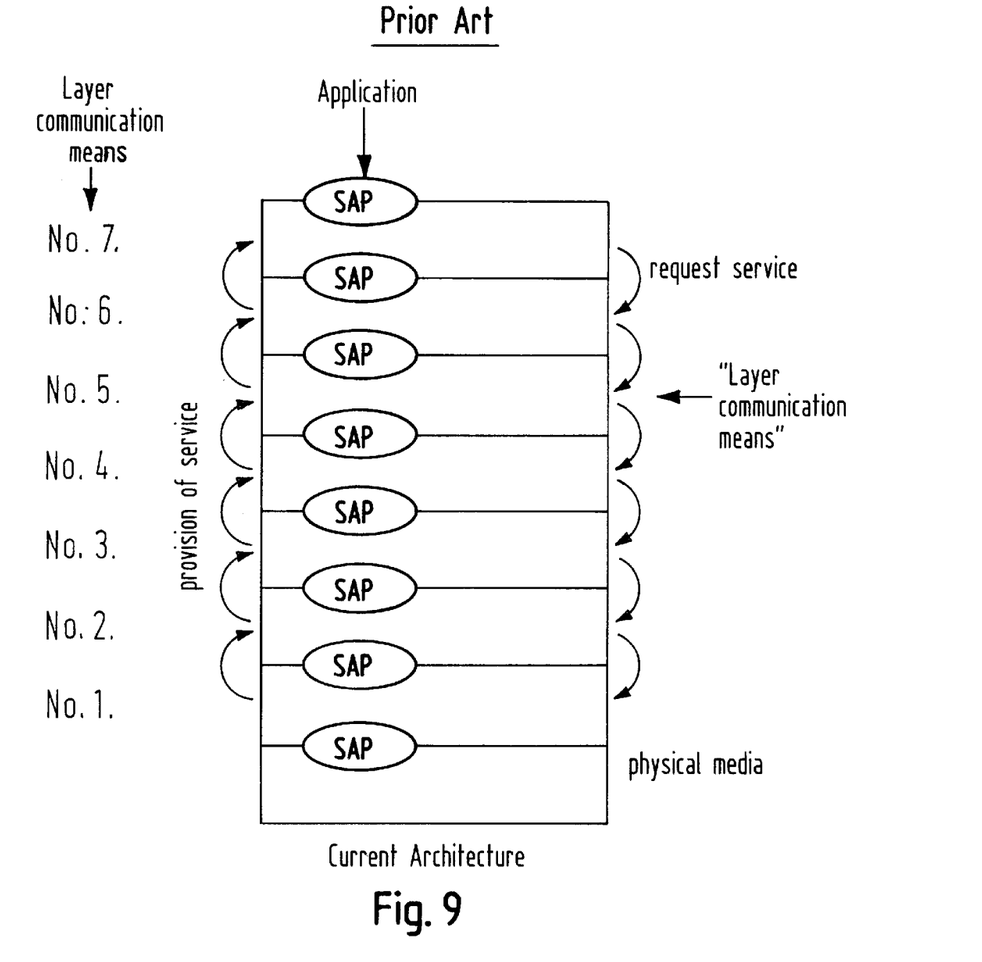
FIG. 9 shows a conventional current architecture with seven layers using conventional uni-directional service access points.

Since the layered architecture of transmission protocols is structured in a top-down way, service access points SAP (a service access interface) are needed to request/use a service from a layer of the next lower order by the layer on top of it. The lower order layer then provides the service to the layer of higher order. FIG. 8 shows such service access interfaces between two layers N, N+1 to interconnect the respective entities in the layers. Here, the service access interfaces may connect entities which lie in the same open system or in fact in two different open systems.

Figure 10:
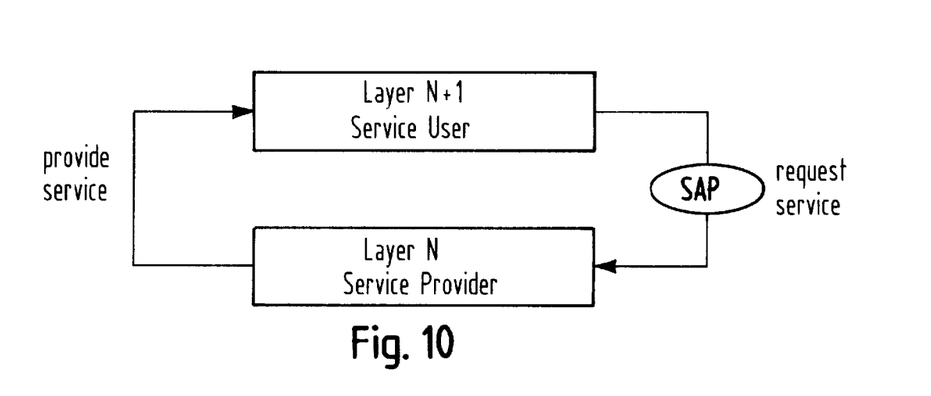
FIG. 10 shows the conventional requesting of a service and provision of a service using conventional service access points.

As is further shown in FIG. 10, 11, the current architecture uses the service access interfaces SAP between two layers in order to request a service through the services access interface, whilst the lower layer provides the service to the higher layer. In order to establish communication within each layer (or in each layer communication means), the layer-specific parameters are used. In FIG. 10, the individual layers are illustrated as rectangular blocks, however, it should be understood that they comprise the configuration of FIG. 7, i.e. the exchange of information between two open systems A, B via the use of protocols and the layer-specific parameters.

DISADVANTAGES OF THE CURRENT ARCHITECTURE

As explained above, when an application is run or requested from the highest layer, in the translation process to the lower layers, each layer inserts a specific portion needed for the complete data communication. However, the applied rules, i.e. the layer-specific parameters (in particular the quality of service parameters QOS) remain in the same layer, since the service access interface is only uni-directional to allow the requesting of a service from the next lower layer. Thus, the application running from the top most layer has no information whatsoever about the quality of service of information exchange within the layers below. Therefore, there is the prime disadvantage in the current architecture that the running application has no information as to whether the communication in the respective lower layers is sufficient or not for supporting a particular aspect of the running application on the specific layer or not and can therefore not adapt its performance to the actual communication conditions.

For example, the application may want to adapt its transmission rate to a bit error rate (BER) which has been detected on one of the lower layers, in particular the physical layer. The problems and background as mentioned above are well described in the following two standard documents, namely:

[1] ITU-T X.200 (07/94) *Information Technology - Open Systems Interconnection - Basic reference model: The basic model*

[2] ITU-T X.207 (11/93) *Information Technology - Open Systems Interconnection - Application Layer structure*

SUMMARY OF THE INVENTION

Thus, the object of the invention is to provide a method, a communication network and a service access interface, where the running application from the application layer can adapt its performance to the actual communication conditions present in the lower layers.

This object is solved by a method for performing communications between cooperating open systems in an open system interconnection communication network where a communication between at least two open systems is performed by use of at least two hierarchically layered layer communication means interconnected through a service access interface and each comprising a number of layer specific services and using a number of layer specific parameters for a communication between said services in the respective layer communication means, wherein said service access interface is a bi-directional upward service access interface and said layer specific parameters are respectively transferred to a next higher order layer communication means through a respective bi-directional service access interface between two layer communication means.

The object is also solved by a communication network performing communications between cooperating open systems arranged in an open system interconnection architecture, comprising:

a) at least two open systems; and b) at least two hierarchically layered layer communication means interconnected through a service access interface and each comprising a number a layer specific services and using a number of layer specific parameters for a communication between said services in the respective layer communication means; wherein d) said service access interface is a bi-directional upward service access interface for respectively transferring said layer specific parameters to a next higher order layer communication means.

The object is also solved by a service access interface for interconnecting two hierarchically layered layer communication means used for performing communications between at least two cooperating open systems in an open system interconnection communication network, each layer communication means comprising a number a layer specific services and using a number of layer specific parameters for a communication between said services in a respective layer communication means; said service access interface (SAP) comprising transfer means for requesting/using a service from a layer communication means of lower order and providing said service to a layer communication means of a higher order, said transfer means further providing to said layer communication means of higher order said layer specific parameters of said layer communication means of lower order.

While the current standards do not allow the running application to be provided with layer-specific parameters from the other lower layers, according to the running application from the application layer has access to the layer-specific parameters used in other layers below.

The inventive solution resides in the fact that lower layer characteristics (i.e. layer-specific parameters from lower layers) are reported at least up to the application layer, in order to allow a proper adaptation of the running application and thus a more efficient execution of the running applications. In the inventive solution, the upward service access interface is not uni-directional as in the case of the prior art, but it is in fact bi-directional allowing the forwarding of layer-specific parameters to the next higher layer. This allows the development of "QOS (quality of service) dependent applications", which is an important factor in developing more advanced applications.

Further advantageous embodiments and improvements of the invention are listed in the dependent claims. Hereinafter, an embodiment of the invention will be described with reference to the attached drawings.

BEST MODE OF THE INVENTION

Figure 1:
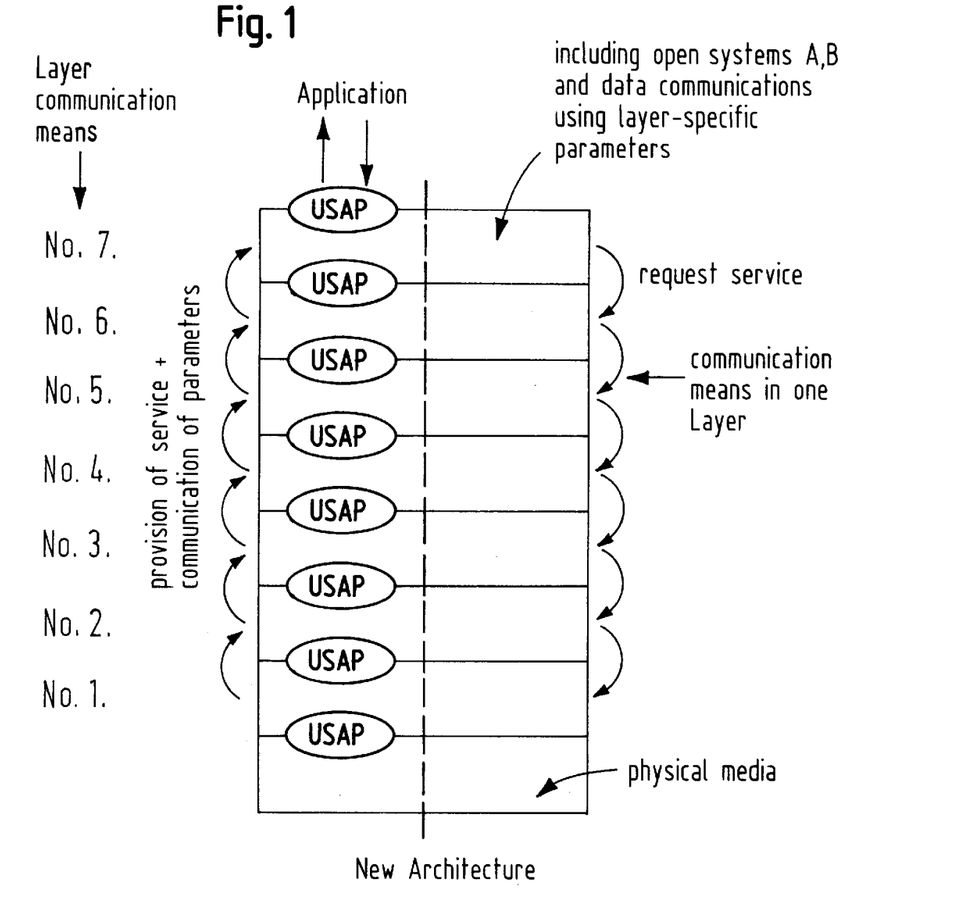
FIG. 1 shows the layered architecture of an open system interconnection network using upward service access points according to the invention.

An embodiment of the invention will be described with reference to FIG. 1, 2. As is seen in FIG. 1, the new proposed architecture is layered in the same manner as in the prior art shown in FIG. 10. That is, each layer consists of a communication means that performs data communication between the open systems A, B (or any further entities as illustrated in FIG. 5). Two layer communication means are respectively interconnected through an upward service access point USAP (interface) similarly as in FIG. 8. That is, the upward service access point USAP may connect entities in the same open system A or entities in two different open systems A, B. The dashed vertical line is to illustrate that the layer communication means in each layer consists of entities of both open systems A, B. In fact, although the layered architecture is an abstract model, it is self-evident that each layer may be represented separately by hardware or software and also the interconnection interface USAP between two layers (the upward service access point) may be realized via hardware or software. Thus, each layer communication means in a respective layer performs all the information exchange needed for an information transfer between entities on the same layer (e.g. the use of specific protocols as is shown in FIG. 6).

Figure 2:
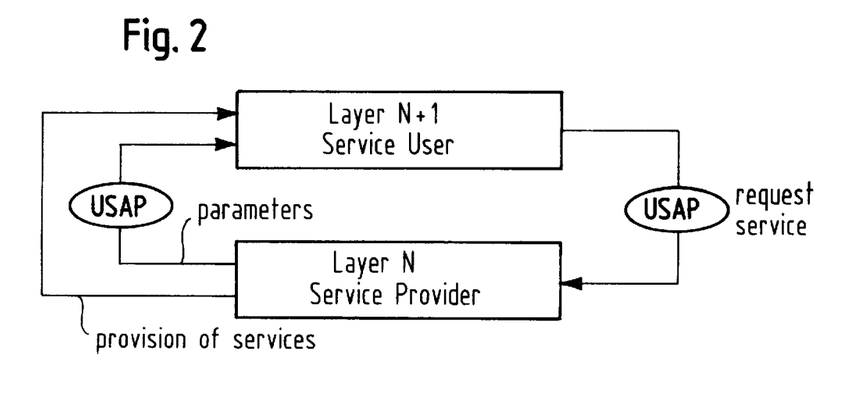
FIG. 2 shows the requesting of a service, the provision of the service and the communication of layer-specific parameters to a higher layer.

As is illustrated in FIG. 2, the upward service access point USAP is not only used for requesting the service from the lower layer M, but it is also used to communicate the layer-specific parameters to the next higher layer. Thus, successively, layer-specific parameters from the lowest layer, e.g. the physical layer, may be communicated to the running application. With the upward service access point clearly being bi-directional, lower layer characteristics may be communicated to higher layers and in particular to the running applications. Thus, every layer communication means may use information from each lower layer below it. Such an upward service access point USAP can thus provide the additional functionality, which is nowadays found in call-back functions of object-orientated APIs (application programmer interfaces). It allows the development of QOS dependent applications, where the application can adapt its own performance to characteristics of the data communications in the other lower layers.

Figure 3:
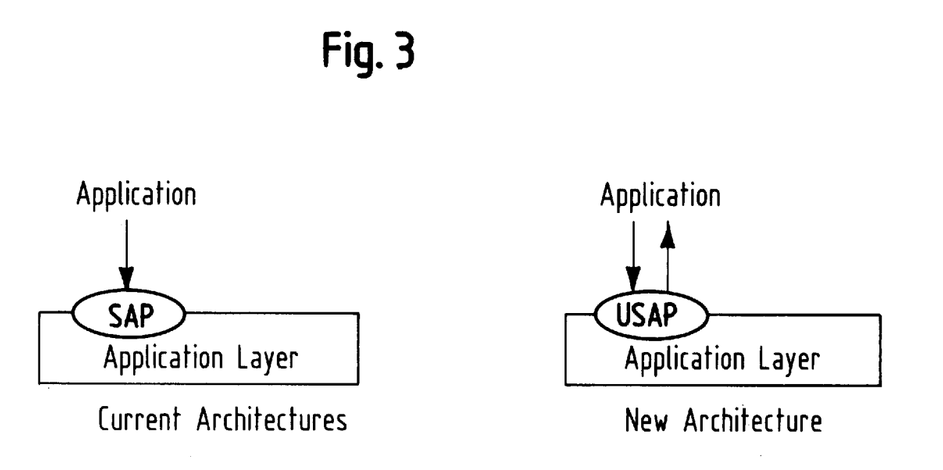
FIG. 3 shows a comparison between the current architectures and the new architecture.

FIG. 3 shows the comparison with the current architectures and it is seen that the new architecture allows a flexible exchange of layer-specific parameters between the application and the application layer.

An example for the usage of an upward SAP is the permanent monitoring of a bit error rate (BER) by an application in order to adapt a forward error correction algorithm to the connection characteristics. In this case, the application would receive information about the current bandwidth and can adapt the generation of data to the current bandwidth value. Thus, the application adapts its performance (a forward error correction algorithm) to the connection characteristics of a lower layer.

The advantages of the invention are especially significant in mobile radio communication or data communication systems, where the bearer quality (which may include may different parameters) can vary in wide ranges and within very short intervals. This is especially true for systems using different radio bearer networks. For example, when setting up a call in a mobile radio communication network, the bandwidth, bit error rate etc. is communicated in the physical layer for setting up the transmission requirements for the call. By using the inventive upward service access point USAP, such characteristics can now be communicated to the application (mobile station), which can then react accordingly and adapt its own performance to the characteristics of the behavior of one or more lower layers. The reaction can either be based on a predetermined profile or application-part, e.g. "do not transmit pixel graphics when bandwidth is below 19.2 kbps", or on real-time input from the use, e.g. "downloading the following graphic takes approximately 30 sec; download (Y/N)?".

Thus, the application may automatically react to specific characteristics of the lower layers, whilst conventionally, the application was restricted to trial and error, i.e. that the pixel graphics transmission eventually took an unexpected and undesirable long time or failed completely. According to the invention, the application can now be provided with information and the application can process this information in order to adapt its performance flexibly.

Therefore, the invention allows the development of applications, which take into account the quality of service in other layers also in real-time.

As a further embodiment of the invention, the service access points do not only communicate the layer-specific parameters to a higher layer, but allow the transfer of layer-specific parameters from a higher layer to a lower layer. Thus, each layer communication means may also adapt its performance to the quality of service in a higher layer.

Reference numerals in the claims do not limit the scope and are included only for reference purposes.

What is claimed is:

1. A method for performing communications between cooperating open systems (OS) in an open system interconnection (OSI) communication network where a communication between at least two open systems (A, B) is performed by use of at least two hierarchically layered layer communication means (N−1, N, N+1) interconnected through a service access interface (SAP) each including a number of layer specific services and using a number of layer specific parameters for a communication between said services in the respective layer communication means, comprising the steps of:

providing the service access interface (SAP) as a bidirectional upward service access interface (USAP); and transferring the layer specific parameters to a next higher order layer communication means (N+1) through a respective bidirectional service access interface (SAP, USAP) between two layer communication means, wherein when the running of an application is requested from the layer communication means (N+1) of highest order in the hierarchy, each layer communication means requests from the layer communication means with the next lower order a specific portion of application data needed for supporting the running of the application in this layer communication means through a service access interface (SAP) and the next lower order layer communication means (N) in response to said request provides said specific portion of application data to the next higher layer requested from the layer communication means having requested the service through said respective access interface (SAP), and wherein said application requested from the layer communications means (N+1) of higher order and running on the basis of said specific portions of application data provided from each layer communication means (n) of lower order adapts its performance to the transferred layer specific parameters received from at least one layer communication means (N) of lower order.

2. A method according to claim 1, wherein the layer specific parameters (QoS) include at least one parameter selected from the group of parameters comprising:

single transmission related parameters including at least one of an expected transmission delay, a probability of corruption, a probability of loss or duplication, a probability of wrong delivery, a cost, a protection from unauthorized access, a priority, a bit error rate (BER) and a current bandwidth;

multiple transmission related parameters including at least one of an expected throughput and/or probability of out of sequence delivery, and connection-mode parameters including at least one of a connection establishment delay, connection establishment failure probability, connection release delay, connection release failure probability and connection resilience.

3. A method according to claim 1, wherein the communication network is a mobile radio communication network, the open systems (A, B) are mobile radio stations and the layer specific parameters (QoS) include at least one parameter selected from the group consisting of a bandwidth, a bit error rate (BER) and a bearer capability of the transmission path.

4. A method according to claim 2, wherein a running application adapts its performance to the transferred layer specific parameters received from a service access interface (USAP) of the layer communication means (N) of highest order; and the application adapts its performance to the connections characteristics transferred by the layer specific parameters.

5. A method according to claim 1, wherein the layer communication means are formed by a seven layer reference model including in hierarchical order from the application: an Application Layer means (No. 7), a Presentation Layer means (No. 6), a Session Layer means (No. 5), a Transport Layer means (No. 4), a Network Layer means (No. 3), a Data Link Layer means (No. 2) and a Physical Layer means (No. 1).

6. A method according to claim 1, wherein an entity of a layer communication means (N+1) requesting a specific portion of application data and an entity in the next lower layer communication means providing the specific portion of application data through said service access interface (USAP) are in the same system or in two different systems.

7. A communication network for performing communications between cooperating open systems (OS) arranged in an open system interconnection (OSI) architecture, comprising:

a) at least two open systems (A, B); and b) at least two hierarchically layered layer communication means (N−1, N, N+1) interconnected through a service access interface (SAP) each including a number a layer specific services and using a number of layer specific parameters for a communication between said services in the respective layer communication means; wherein said service access interface (SAP) is a bidirectional upward service access interface (USAP) for respectively transferring said layer specific parameters to a next higher order layer communication means (N+1).

wherein when the running of an application is requested from the layer communication means (N+1) of highest order in the hierarchy, each layer communication means requests from the layer communication means with the next lower order a specific portion of application data needed for supporting the running of the application in this layer communication means through a service access interface (SAP) and the next lower order layer communication means (N) in response to said request provides said specific portion of application data to the next higher layer requested from the layer communication means having requested the service through said respective access interface (SAP), and wherein said application requested from the layer communications means N+1) of higher order and running on the basis of said specific portions of application data provided from each layer communication means (n) of lower order adapts its performance to the transferred layer specific parameters received from at least one layer communication means (N) of lower order.

8. A communication network according to claim 5, wherein the layer specific parameters (QoS) include at least one parameter selected from the group consisting of:

single transmission related parameters including at least one of an expected transmission delay, a probability of corruption, a probability of loss or duplication, a probability of wrong delivery, a cost, a protection from unauthorized access, a priority, a bit error rate (BER) and a current bandwidth;

multiple transmission related parameters including at least one of an expected throughput and/or probability of out of sequence delivery, and connection-mode parameters including at least one of a connection establishment delay, connection establishment failure probability, connection release delay, connection release failure probability and connection resilience.

9. A communication network according to claim 5, wherein the communication network is a mobile radio communication network, the open systems (A, B) are mobile radio stations and the layer specific parameters (QoS) include at least one parameter selected from the group consisting of a bandwidth, a bit error rate (BER) and a bearer capability of the transmission path.

10. A communication network according to claim 8, wherein a running application adapts its performance to the transferred layer specific parameters received from a service access interface (USAP) of the layer communication means (N) of the highest order; and the application adapts its performance to the connections characteristics transferred by the layer specific parameters.

11. A communication network according to claim 5, wherein the layer communication means are formed by a seven layer reference model comprising in hierarchical order from the application: an Application Layer means (No. 7), a Presentation Layer means (No. 6), a Session Layer means (No. 5), a Transport Layer means (No. 4), a Network Layer means (No. 3), a Data Link Layer means (No. 2) and a Physical Layer means (No. 1).

12. A communication network according to claim 5, wherein an entity of a layer communication means (N+1) requesting a specific portion of application data and an entity in the next lower layer communication means providing the service through the specific portion of application data access interface (USAP) are in the same system or in two different systems.

13. A service access interface (SAP, USAP) for interconnecting two hierarchically layered layer communication means (N−1, N, N+1) used for performing communications between at least two cooperating open systems (OS) in an open system interconnection (OSI) communication network, each layer communication means including a number a layer specific services and using a number of layer specific parameters for a communication between said services in a respective layer communication means; said service access interface (SAP) comprising:

transfer means for requesting/using a service from a layer communication means of lower order and providing said service to a layer communication means of a higher order, wherein said transfer means further provides to the layer communication means of higher order the layer specific parameters of the layer communication means of lower order, wherein when the running of an application is requested from the layer communication means (N+1) of highest order in the hierarchy, each layer communication means requests from the layer communication means with the next lower order a specific portion of application data needed for supporting the running of the application in this layer communication means through a service access interface (SAP) and the next lower order layer communication means (N) in response to said request provides said specific portion of application data to the next higher layer requested from the layer communication means having requested the service through said respective access interface (SAP), and wherein said application requested from the layer communications means (N+1) of higher order and running on the basis of said specific portions of application data provided from each layer communication means (n) of lower order adapts its performance to the transferred layer specific parameters received from at least one layer communication means (N) of lower order.

* * * * *